(No Model.)
W. J. O'BYRNE.
CENTER PLATE FOR CAR TRUCKS.
No. 515,246. Patented Feb. 20, 1894.
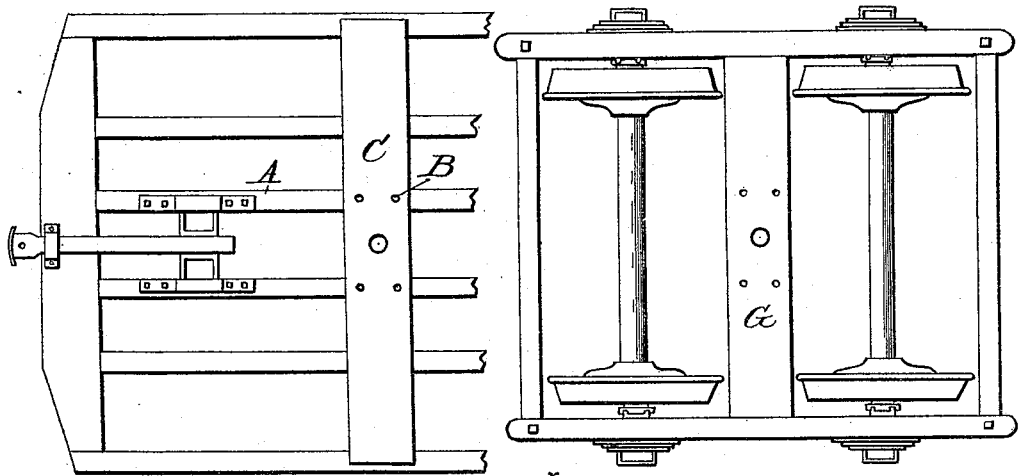
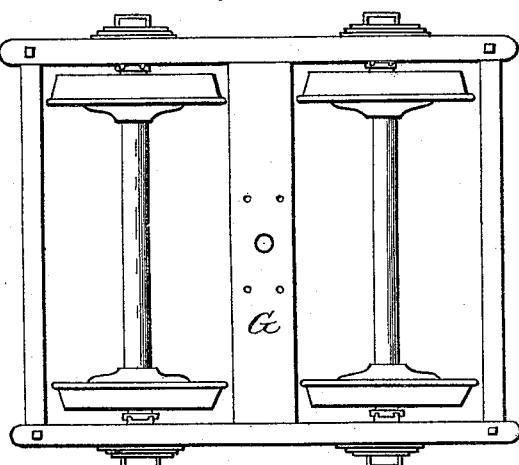
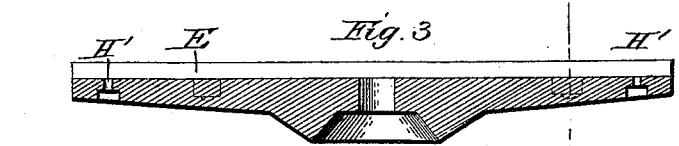
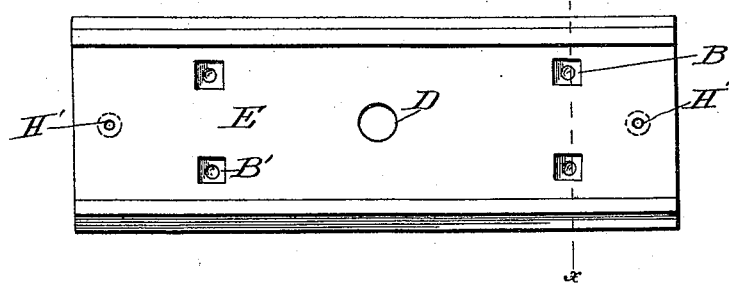
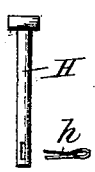
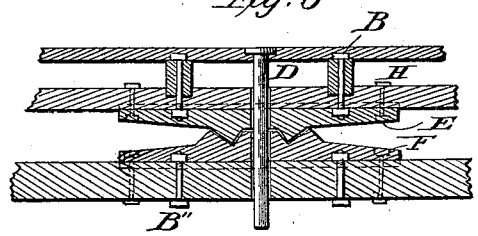
WITNESSES
F. L. Ourand
Jos. Gregory
INVENTOR.
Wm. J. O'Byrne.
By Saml. J. Wallace,
Attorney.
THE NATIONAL LITHOGRAPHING COMPANY,
WASHINGTON, D. C.

UNITED STATES PATENT OFFICE.

WILLIAM J. O'BYRNE, OF PONTOOSUC, ILLINOIS.

CENTER-PLATE FOR CAR-TRUCKS.

SPECIFICATION forming part of Letters Patent No. 515,246, dated February 20, 1894.

Application filed July 15, 1893. Serial No. 480,649. (No model.)

*To all whom it may concern:*

Be it known that I, WILLIAM J. O'BYRNE, a citizen of the United States, residing at Pontoosuc, in the county of Hancock and State of Illinois, have invented a new and useful Improvement in Freight-Cars and their Center-Plates, which is made and used substantially as set forth hereinafter and as shown in the accompanying drawings, in which—

Figure 1 shows part of bottom of car, from below. Fig. 2, shows top of the truck. Fig. 3, shows section of bolster plate. Fig. 4, shows top of bolster plate. Fig. 5, shows cross-section of bolster plate. Fig. 6, shows section of bolster. Fig. 7, shows pin to hold bolster plate.

This invention consists in an improved arrangement of parts relating to the junction of the wheel trucks with freight cars, their joint plates, and some details therein, which are made and arranged substantially as shown and as set forth hereinafter.

Freight cars have lengthwise floor beams, sleepers or sills A, which are held by cross beams at the ends and at the points where the wheel trucks are held, and other places, where they are firmly bolted and jointed to form a strong and solid structure. The cross or transom beam C where the car is held by the wheel truck is made heavy to hold the weight of the car, and it is provided with a center plate E, by which it rests on a similar plate F on the truck, which in turn rests on a cross beam G, held by the truck. The car and truck are held by a king bolt D, through the cross beams C, G, and the two plates E, F. The two sills A, near the center of the car are held to the transom beam C, by bolts B. In usual practice these pass through the plate E, and are held by nuts underneath it, so as to make it all one structure; and like bolts come up through the truck beam G, and its plate F, which match with those from above. This is the usual arrangement, made for convenience in finishing and in reaching the nuts to keep them tight, as well as for making the whole structure strong. But there is an attendant evil. In passing curves, where the outer rail is raised and raises the outer side of the wheel trucks, the momentum carries the car body over so as to bring the projecting ends of the bolts B, above and below together, although made to stand apart well on the level, and as the curve causes the cross beam G, of the truck to turn out of line with that of the car, C, the projecting bolts catch against each other and break off or bend so as to require cutting off. The inconvenience of reaching them causes the bolts to be left in a useless state, so that a large proportion, sometimes ninety per cent., are found useless and left so.

The object of this invention is to avoid such evils as well as the like evil of the nuts getting loose, where not damaged, and also left so, from inconvenience in reaching them; which leaves the car in an imperfect condition of strength, although it may not be noticeably dangerous. To this end the cross bars C, G, are bolted in place on the car and truck separate from the plates E, F, and their nuts driven up firmly secure before those plates are applied. These plates are then made to project beyond the cross beams C, G, with flanges to fit against the sides of the beams, and prevent displacement; and in their faces square holes are made to fit and match with the nuts or heads on bolts B, to receive and prevent them turning to get loose in use; and it is arranged that the ends of the bolts will not project more than flush with the outer faces of the plates so that they can not interfere in any way, and so that the bolts will prevent movement between the plates and cross beams. As the parts cannot get apart except in case of the car turning over small bolts H, only are needed to hold the plates to the car and truck. These have countersunk seats for their heads, or for split keys *h*, which are used when the head is at the hidden end, so that nothing will project to catch and get injured, although it would not weaken the car body in any way if they got broken off. The plates E, F, are provided with truncated ball and socket bearings as working pivots.

I claim—

1. A car having its floor stringers or sills firmly bolted to its transom or cross beam independent and free of the center bearing plate, and having in such plate cavities fitted to engage with and hold the nuts or heads of the bolts which connect the sills and beams and are covered by the plate, to prevent them turning in use.

2. A car having its floor stringers or sills and cross beams held firmly together free of the center plate, and a center plate having a seat between side flanges for the cross beam, and seats for nuts or bolts projecting from the beam to prevent movement between the plate and cross beam in use.

3. A car having a center plate E with side flanges to hold the cross beam C thereon and seats fitted to receive and hold from turning the nuts or heads of the bolts B, holding the stringers or sills to the cross beam, and separate holding bolts, and truncated ball and socket bearings with its truck center plate.

4. A car having four sills A and cross beams C, held together by bolts B independent of the center plate E, the center plate E, with side flanges and cavities to fit and hold the nuts or heads of bolts B, to prevent turning, and holding bolts with split key holders, and center plates F, for trucks, and truncated ball and socket bearings between plates E, F, substantially as set forth.

WILLIAM J. O'BYRNE.

Witnesses:
G. C. ENGELHARD,
LOUIS THANNERT.